C. P. HASSELGREN.
COLLAPSIBLE FLY TRAP.
APPLICATION FILED FEB. 25, 1916.

1,191,179.

Patented July 18, 1916.

WITNESSES:
J. B. Watts.
C. L. Stephens.

INVENTOR.
C. P. Hasselgren.
BY Geo. Stevens.
ATTORNEY.

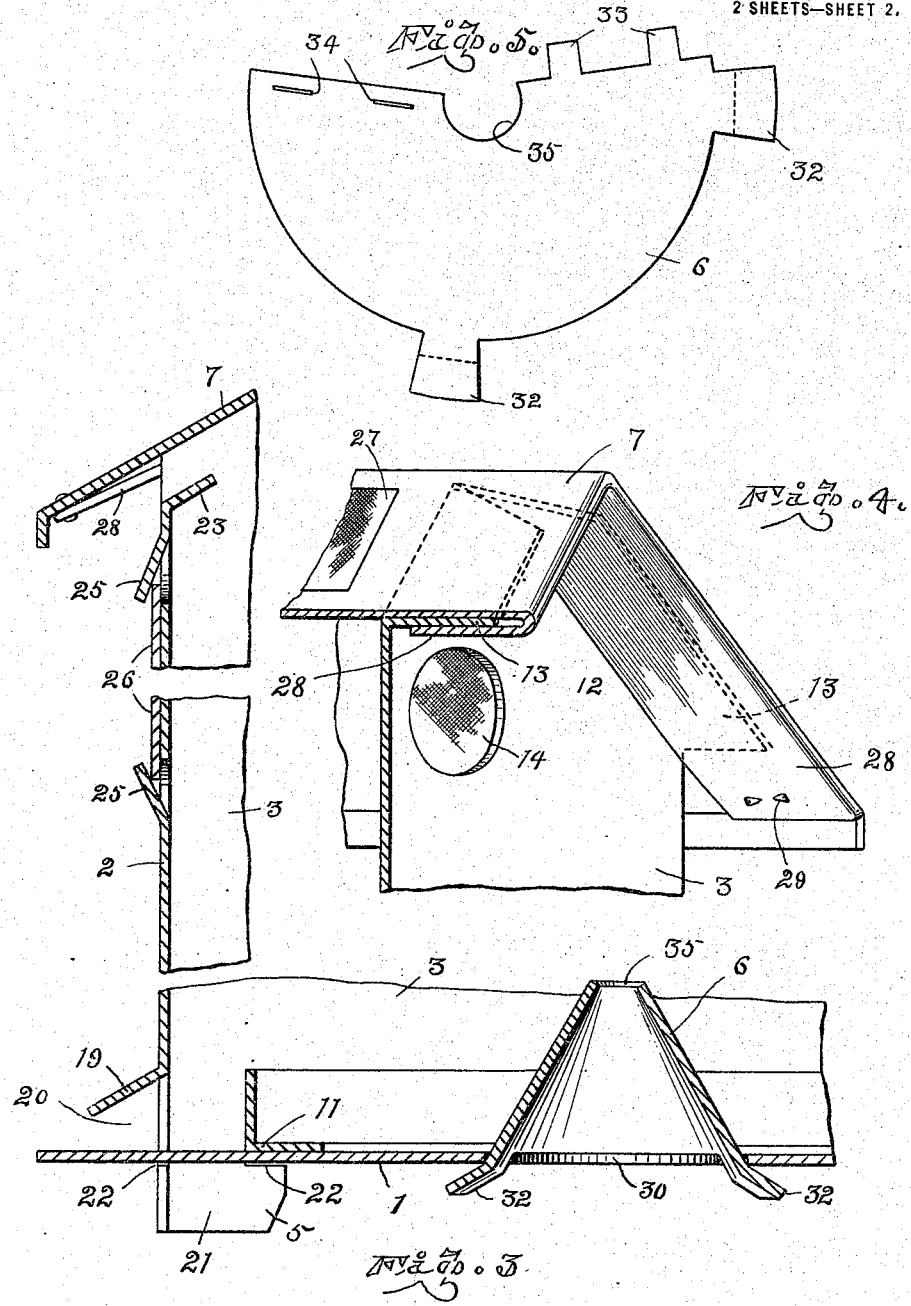

UNITED STATES PATENT OFFICE.

CARL P. HASSELGREN, OF DULUTH, MINNESOTA.

COLLAPSIBLE FLY-TRAP.

1,191,179.  Specification of Letters Patent.  Patented July 18, 1916.

Application filed February 25, 1916. Serial No. 80,377.

*To all whom it may concern:*

Be it known that I, CARL P. HASSELGREN, a citizen of the United States, residing at Duluth, in the county of St. Louis and State of Minnesota, have invented certain new and useful Improvements in Collapsible Fly-Traps, of which the following is a specification, reference being had therein to the accompanying drawing.

This invention consists of certain improvements in fly traps and relates especially to the peculiar construction of an ornamental collapsible trap for household use.

One object is to produce a device of this character sufficiently pleasing to the eye as to admit of its use any place within a house, and especially within close proximity to a dining table where flies are wont to assemble and become especially objectionable.

Another object is to produce such a device constructed of a material and in such a manner as to be readily collapsible both for shipping purposes and convenience in storage when not in use.

Another object is to produce a fly trap adaptable as a receptacle for portable advertising matter and still another object is cheapness of construction.

Figure 1:
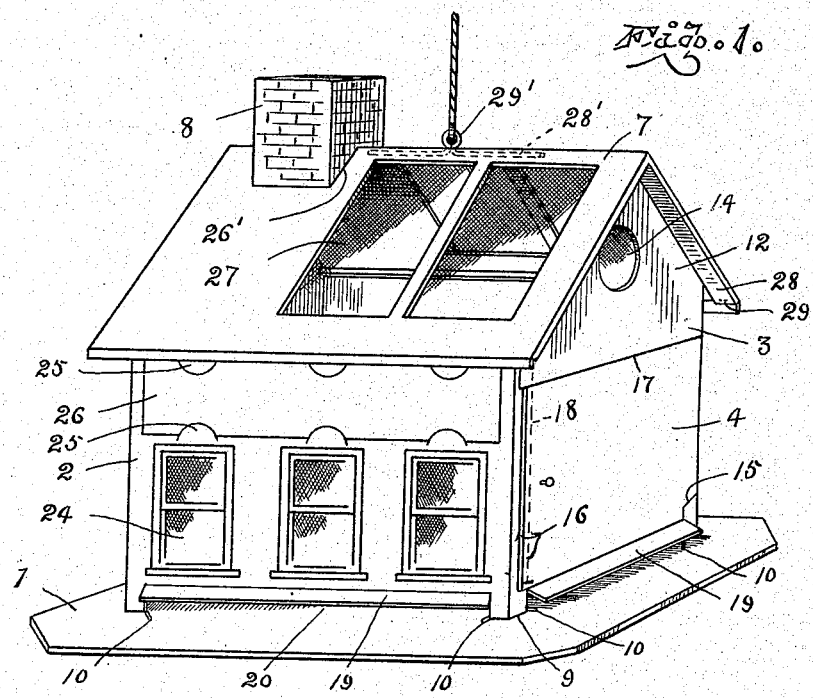
Figure 2:
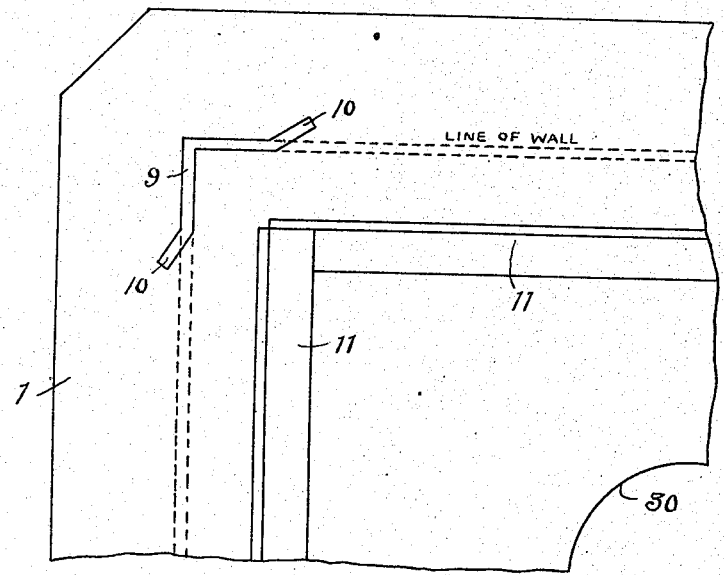

In the accompanying drawings forming part of this application and in which like reference characters indicate like parts: Figure 1 is a perspective view of my complete fly trap assembled. Fig. 2 is a plan view of one corner of the floor of the trap. Fig. 3 is a broken vertical sectional view through one side of the trap. Fig. 4 is a perspective view partly in section of a fragmental portion of the gable end of the trap, and Fig. 5 is a plan of the cone entrance.

The trap comprises a receptacle in the form of a house composed of five separable sections, the rectangular shaped base 1, side and end walls 2 and 3 respectively, conical entrance 6, roof 7 and chimney 8.

The entire receptacle is constructed of paper, of a suitable weight for the purpose and a quality of paper that will respond readily to repeated folding, such as heavy card board or the like. The base or foundation 1 of the receptacle is formed of a piece of paper somewhat larger than the outline of the walls of the house and near each corner of the latter are right angular shaped slits 9 formed through the sheet and each slit terminates in flaring or wing portions 10, the object of which will be described later. Upon the upper face of the base 1 is securely fastened by glue or other means desired, four angularly bent or shaped strips 11, they having one edge extending upwardly and at right angles to the base and are placed about a line upon the base considerably smaller than that corresponding to the walls of the house, so that the angles will extend upwardly all around the interior of the walls but some little distance therefrom, for a purpose described later.

The walls 2 and 3 are made of a single piece of paper having the ends thereof united, thus forming a complete inclosure which may be collapsed upon itself when not assembled with the other coöperating parts of the structure, and in which event one end wall will lie flat against one side wall and the opposite end wall against the opposite side wall. Each end wall 3 is formed with an upwardly extending gable portion 12 which has upon its inclined edges outwardly bent flanges 13—13 which normally extend at right angles thereto and which are for engagement with the roof portion of the structure and in each gable is formed an opening 14. The lowermost portion 4 of one of the ends 3 is separable from the balance of the end along the lines 15, 16 and 17 so that such portion may be opened or closed forming a door to the receptacle, there being sufficient of the abutting end of the side wall turned at right angles to said side wall to form a suitable jamb 18 for the door and any form of catch or fastening may be used, the door swinging freely upon the angle forming the corner of the house adjacent the line 15. The lowermost edge of each wall of the house including the door has a strip 19 separated therefrom at its ends and bent so as to normally remain at an inclined angle to the wall as shown in Fig. 3 which provides an open space or entrance 20 thereunder, for the flies. These cut and outwardly bent portions leave at each corner of the walls a downwardly extending pedestal member 21, which is designed to pass through the slits or opening 9—10 in the base and thereby connect the walls of the house with the base.

Horizontal slots 22 are formed in both edges of each pedestal member and the upper edge of which slot is parallel with the lowermost edge of the bent strip 19, prior to its having been bent from its vertical wall.

Thus when said pedestal members are inserted within the slits 9—10, the free end portions 5 of the members will have to be slightly bent laterally to pass through the wings 10 of the slits and after once through will assume their normal position in alinement with each respective wall of the pedestal, which will form locking means for the members and prevent their accidental withdrawal. The uppermost edge of the slots 22 will rest upon the upper surface of the base 1 and thus gage the depth of insertion of the pedestals and which depth is governed to form suitable fly entrances, under the vertical walls, communicating direct with the interior of the house and shielded by the inclined strip 19. While these entrances lead direct to the interior of the house, they are obstructed somewhat by the upwardly extending portion of the angle bars 11 and over which the flies are obliged to crawl, and the object of such obstruction 11 and shield 19 is to somewhat darken the entrance and render the same hard to find upon any attempt on the part of the flies to retrace their inward course. The uppermost edges of the two side walls 2—2, are bent inwardly and downwardly as at 23 so as to normally remain in an inclined position and form a convenient entrance way for flies under the roof.

A plurality of openings 24 representing windows are formed in the lower portion of the sides 2—2, and between the windows and the inwardly bent edge 23 are formed two horizontal rows of semicircularly cut members 25 which may be bent outwardly and a display or advertising card 26 slipped in between the members 25 and the side of the walls and thereby removably held in position.

The roof 7 is composed of a flat piece of paper folded through the center longitudinally in such a manner as to normally resume a position at an angle with each other and appear as a peaked roof and four rectangular shaped openings 27 are formed therethrough as a skylight. The gable ends 28 of the roof are folded under and against the roof and at the eaves are secured thereto by means of some suitable fastener 29 or glue, if preferred, to provide a pocket intermediate the folded portions for the flanges 13 formed integral with each gable end and into which pockets the flanges are forced when the roof 7 is applied which results in a secure fastening of the roof to the walls. The extreme edges of the eaves are crimped or bent downward so as to normally remain vertical when the roof is in place upon the house, and for the purpose of darkening the fly entrance under the eaves.

Transverse the ridge of the roof and near one end thereof are formed two slits 26'—26' into which removably fit two walls of the chimney 8 and the other two opposite walls rest upon the roof intermediate the ends of the slits, when in place. The chimney is composed of a single piece of paper folded into four equal divisions and the ends united, which arrangement admits of it being collapsed into flat form. A wire 28' engages the under side of the ridge and has formed in the center thereof the loop or eye 29' which extends up through the ridge to provide means whereby the trap may be suspended.

As an additional means of access for the flies, I provide a circular opening 30 through the base 1 and fit thereover the conically shaped shield 6, having depending fastening members 32 formed integral therewith and which are intended to be bent outwardly and upwardly toward the under side of the base 1 after the cone is put in place over the hole, and by which it is held in place.

One of the radial edges of the piece of which the cone is composed has formed thereon fastening members 33—33, which engages slits 34—34 in the opposite radial edge thereof when the edges are united, the former edge overlapping the latter and a circular opening 35 is formed in the center, as an entrance for the flies.

I prefer to cover the various openings representing windows formed in the walls and roof, with fine gauze which will admit as much light as possible but prevent the escape of the entrapped flies; however, a plurality of fine holes may be made to answer the same purpose, or any other form of transparent covering might be used.

Various color schemes may be utilized to make the trap attractive and decorative and it is possible other material than paper may be employed in the construction thereof without departing from the spirit of the invention.

It is understood that any form of bait may be used within the trap to attract the flies.

Having thus described my invention what I claim as new and desire to secure by Letters Patent, is:

1. A collapsible fly trap of the character described, comprising a base, a foldable removable body portion supported upon the base, a foldable removable projecting roof supported upon the body portion, light admitting openings in the roof, fly entrances through the body portion, means for preventing light shining directly into the entrances, upwardly projecting walls spaced inwardly from the entrances and projecting above same and means for removing the flies from the trap.

2. In a collapsible fly trap of the character described, having a rectangular shaped foldable body portion, and a base, right angular shaped slits formed through the base adjacent the corners thereof, the ends of the slits extending laterally at an angle thereto, pedestal members upon the body portion for engaging the slits and having flaps thereupon, whereby after the pedestal members are extended through the slits the flaps will assume normal alinement with the rigid portion of the pedestals and thus lock the same within the base.

3. The combination with a collapsible fly trap of the character described, having a separable base, body portion and roof, of slits in the base, projections formed integral with the body portion for locking engagement through the slits, laterally projecting flanges upon the gables of the body and pockets in the roof for locking engagement with the flanges, substantially as shown and described.

4. The combination with a collapsible fly trap of the character described, comprising a base, a foldable body portion removably supported by the base, a foldable projecting roof removably supported by the body portion and having light admitting openings therein, of fly entrances formed longitudinally the sides and adjacent the eaves by the upper edges of the side walls being turned down inwardly forming such entrances and exit guards thereto, similar entrances formed in the lower edges of the side walls, by turning a portion of the latter outwardly and upwardly forming such entrances and light shields therefor, and vertical guard walls fixed to the base within the body portion and spaced a distance from the entrances to prevent exit of the flies, substantially as shown and described.

In testimony whereof I hereunto affix my signature in the presence of two witnesses.

CARL P. HASSELGREN.

Witnesses:
W. H. DENHAM,
S. GEO. STEVENS.

Copies of this patent may be obtained for five cents each, by addressing the "Commissioner of Patents, Washington, D. C."